May 27, 1930.  L. A. BAUM  1,759,932
RUMBLE SEAT TOP
Filed June 6, 1928   2 Sheets-Sheet 1

INVENTOR
Leopold A. Baum
BY
ATTORNEYS

May 27, 1930. L. A. BAUM 1,759,932
RUMBLE SEAT TOP
Filed June 6, 1928 2 Sheets-Sheet 2
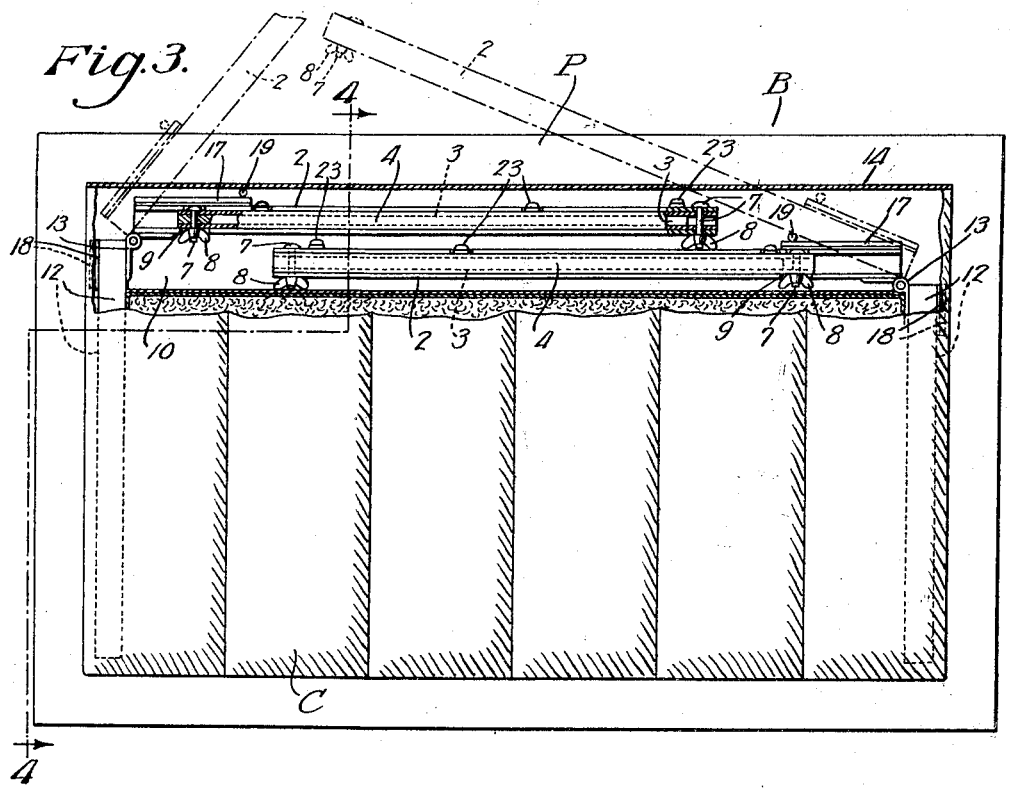
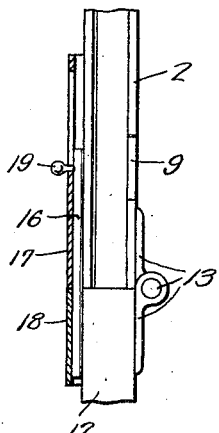
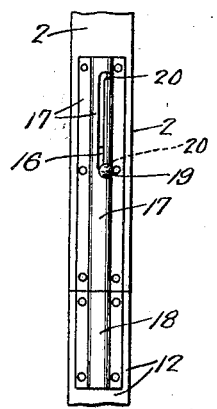
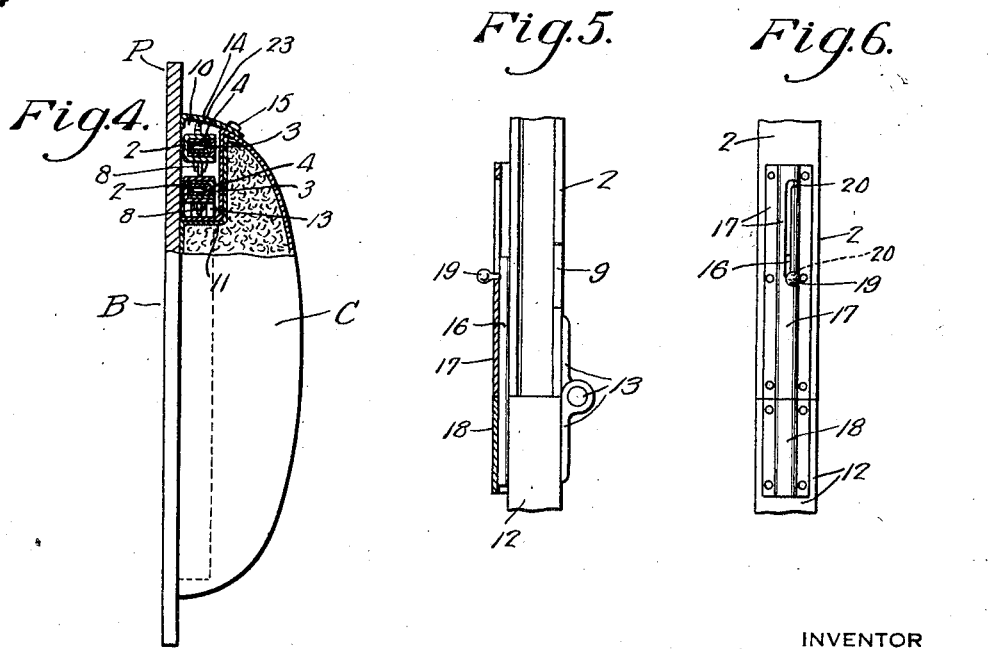
INVENTOR
Leopold A. Baum
BY
ATTORNEYS Patented May 27, 1930

1,759,932

UNITED STATES PATENT OFFICE

LEOPOLD A. BAUM, OF NEWARK, NEW JERSEY

RUMBLE-SEAT TOP

Application filed June 6, 1928. Serial No. 283,340.

An important object of the present invention is to provide an improved collapsible top structure for an automobile rumble seat.

Another object of the invention is the provision of a foldable top structure for a vehicle seat, and improved storage means to receive said structure when it is folded.

Another object of the invention is the provision of a foldable top structure for a rumble seat in combination with a concealed storage compartment formed within the back of the seat to receive said top structure, the latter being adapted to fold compactly into the compartment without detachment from its mountings.

Another object of the invention is the provision of a foldable top structure for the rumble seat of an automobile, which is permanently attached to the back of the seat, adapted to fold compactly at the front thereof, and adaped to fold down with the seat back and occupy a concealed position within the body of the automobile.

Other objects will appear hereinafter.

Figure 1:
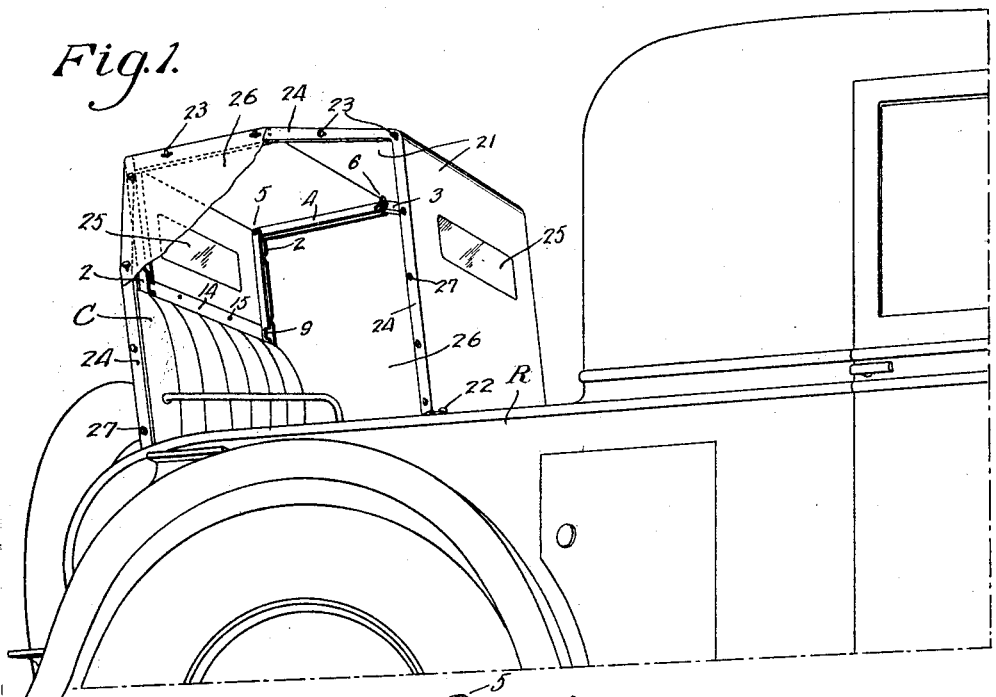
Figure 2:
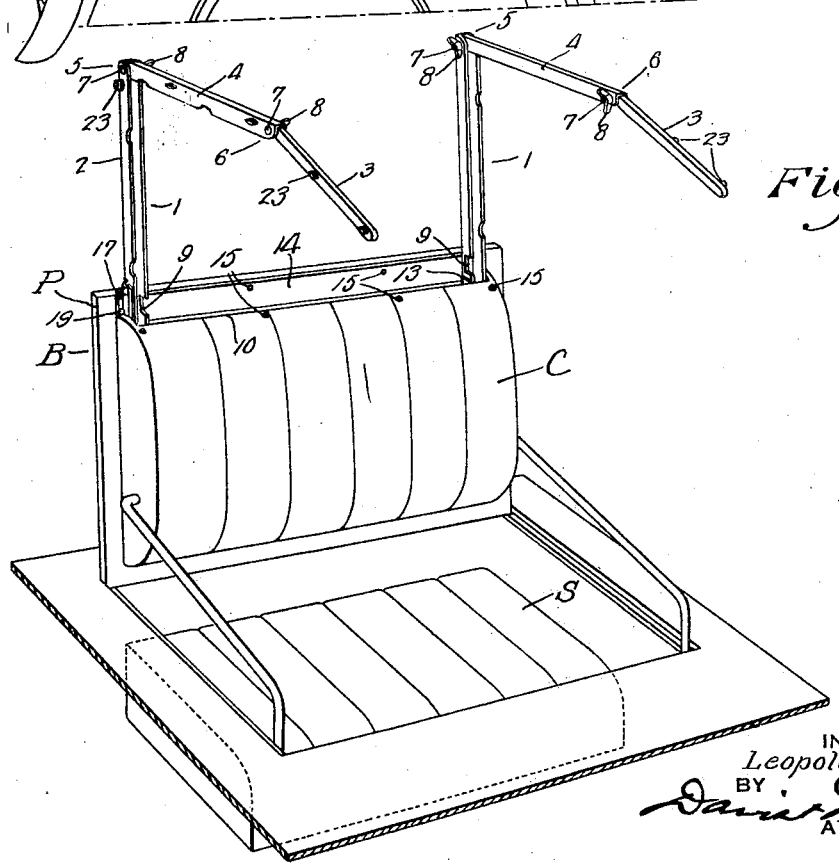

In the drawings, Fig. 1 is a perspective view of the rear portion of an automobile provided with a rumble seat and equipped with my improved top structure;

Fig. 2 a perspective view of the rumble seat and the frame of the top structure;

Fig. 3 a front elevation of the back of the seat with a portion thereof broken away to disclose the top frame folded into its storage compartment;

Fig. 4 a vertical section taken on the line 4—4 of Fig. 3;

Fig. 5 a detail front view partly in section, of one of the hinge and locking connections between the top frame and the seat; and Fig. 6 a side view of the hinge and locking connection shown in Fig. 5.

My improved top is attached to the folding back with which automobile rumble seats of standard form are provided. In the drawings the seat proper is designated S and occupies a depressed position in a cockpit formed in the rear portion R of the car body. The back B of the seat is hinged at the rear edge of the hatchway of the pit and is adapted to fold down and close the hatchway when the seat is not in use. A cushion C covers most of the front area of the seat back, and formed within said cushion is a storage compartment for the frame structure. When the latter is not needed it is adapted to fold into said compartment so that it will not obstruct the closing of the back.

The top structure includes a pair of frame members 1 formed of straight, rigid sections connected together end to end. There are two end sections 2 and 3 and an intermediate section 4. These sections are connected together by two hinging and clamping joints 5 and 6. The end section 2 and the intermediate section 4 are of channel iron construction and are so proportioned and connected that the section 4 will fold at the joint 5 and nest within the section 2. Similarly the end section 3 is adapted to fold at the joint 6 and nest within the intermediate section 4 so that when either of the frame members 1 is fully folded the sections thereof will all lie compactly within the compass of the section 2. Each of the joints 5 and 6 is formed by a pivot and clamping bolt 7 which passes through apertures in the ends of the connected sections and has a winged nut 8 threaded upon it. The channel sections 2 are notched as at 9 to provide clearance for said nuts when the frame member is folded.

Formed within the upper end of the cushion C is a storage compartment 10 for receiving the folded frame members 1. This compartment is in the form of a channel which extends along the upper edge of the cushion between the latter and the rigid back panel P and opens upwardly. It may be formed in any suitable manner, as by securing an angular reinforcing member 11 to the panel P and training the covering of the cushion inwardly around said member as indicated in Fig. 4. Two rigid bars 12 are secured to the panel P just within the side edges of the cushion and extend parallel along said edges and into the bottom of the channel 10 at the ends thereof. The upper ends of these bars which project into the channel form supports for the frame members 1. Each end section 2 of the latter is permanently connected at one end to one of the bars 12 by a hinge 13. These hinges are disposed upon the inner sides of the bars 12 and are so connected to the frame sections 2 that the channel edges of the latter are directed forwardly, and said sections, with the folded sections 3 and 4 therein, will fold down into the storage channel 10. One of the bars 12 projects farther into the channel than the other bar in order to elevate its attached hinge 13 and adapt the frame members to fold neatly into parallel superposed positions within the channel, the latter being of sufficient depth to accommodate the members in this arrangement. The frame sections 2 are also of unequal length, the shorter one being hinged to the longer bar 12 to compensate for the inequality in the lengths of the bars and dispose the joints 5 at the same height when the frame is erected. Attached to the back panel P is a closure flap 14 which is adapted to fold down over the channel 10 to close it and conceal the folded frame members. The flap may be formed of the same flexible material as the covering of the cushion and it is held closed by any suitable fastening means, such as snap buttons 15.

When it is desired to erect the top over the seat S the flap 14 is unfastened and swung back to uncover the channel 10, and the folded frame members 1 are swung about their hinges 13 to upright positions at the upper ends of the supporting bars 12. The opposed ends of the bars and the frame sections 2 are squared and are so hinged that they will accurately abut. To hold said sections upright, bolts 16 are provided. These bolts are slidably mounted in guides 17 attached to the outer sides of the frame sections 2 and are adapted to be projected beyond the lower ends of said sections to engage in keepers 18 secured to the outer sides of the bars 12 and thereby hold the sections 2 rigidly upright. Each bolt is provided with an operating knob 19 which projects through a longitudinal slot in its guide and is adapted to be engaged in transverse notches 20 at the opposite ends of the guide slot to hold the bolt projected or retracted. Due to the hinging of the sections 2 with the channel edges thereof directed forward the other sections 3 and 4 are disposed to unfold forwardly over the seat S in canopy-supporting position. They are held extended by tightening the clamping nuts 8 at the joints 5 and 6. The two frame members 1 are thus held erect by the releasable bolts 16 and the releasable clamping means at the folding joints 5 and 6.

The canopy supported by the frame members is in the form of an elongated sheet 21 of waterproof material. It extends upwardly at the rear of the back B, along the upright sections 2, forwardly along the sections 3 and 4 and then downwardly from the forward end of the section 3 to the automobile body. Here it is preferably detachably fastened in any suitable manner as indicated at 22, and by adjusting the sections 3 and 4 at their hinge connections it can be properly stretched. The canopy is detachably fastened to the various frame members in any suitable manner as by buttons 23 carried by said members and engaging in button-holes formed in inturned margins 24 which extend along the side edges of the canopy. The front and rear vertical portions of the canopy are provided with transparent window panels 25. The space defined by the frame members and the canopy is closed at the sides by waterproof side curtains 26. These curtains are detachably held in place in any suitable manner as by the buttons 23 and by buttons 27 carried by the side margins of the canopy.

The top structure is readily collapsed by removing the side curtains and canopy, unscrewing the clamping nuts 8, folding the outer sections 3 into the sections 4 and folding the latter compactly into the upright sections 2. The bolts 16 are then retracted and the frame members are folded down compactly into the compartment 10 and the flap 14 is closed. The entire top frame is then concealed and lies entirely within the compass of the back cushion C and no obstruction is offered to the folding down of the back B over the hatchway. It does not mar the appearance of the car in either the raised or lowered position of the back. All of the frame parts including the sections, the hinges, the clamping means and the locks, remain assembled and connected to the seat back in both the erected and the collapsed positions of the frame. This avoids the labor and confusion of assembling the parts and facilitates the erection of the frame.

While I have shown and described a practicable and desirable form of my invention I do not wish to be limited to this disclosure, but reserve the right to make such changes in structure and application as will lie within the scope of the claims.

What I claim is:

1. The combination of an automobile body provided with a cockpit containing a depressed rumble seat; a cushioned back for said seat mounted to fold down and close the cockpit and provided with an elongated upwardly opening compartment within the cushion and extending along the upper edge thereof; a collapsible top structure for the seat comprising a plurality of canopy-supporting channel frame members each frame member consisting of a rear channel member adapted to unfold to vertical position with the channel facing forward, and a series of nestable top members hinged together and to the upper end of each of the rear members and adapted to fold together one within the other fore-and-aft of the automobile and to be then folded with the channel of the rear member, hinge connections between the lower ends of the rear members and the seat back, said hinge connections being within the said compartment, and adapting the rear members and the folded top members to fold down transversely of the automobile along the top of the foldable seat and to lie within the said compartment, whereby they will not obstruct the folding down of the seat back and will be disposed within the automobile body when the back is closed; and means to releasably hold the top frame members unfolded and extended forward from the top of the rear members, and the rear members erect for supporting a canopy.

2. The combination of a back for the rumble seat of an automobile comprising a rigid back panel, and a cushion attached to the front face of the panel; means forming a compartment disposed at the front face of the panel and within the cushion, said compartment extending along the upper edge of the cushion and opening upwardly therethrough; a sectional longitudinally foldable frame at each end of the said compartment for supporting a canopy over the seat comprising a main member and a series of members adapted to be folded longitudinally on each other and on the main member to form a compact vertical cluster; hinge means disposed entirely within said compartment and connecting the lower ends of the main members of the frame to the seat back, the folded frames being adapted to fold transversely of the automobile and to lie one above the other entirely within the compartment; means to hold said frames erect, disposed entirely within said compartment when the frame is folded therein; a closure flap hinged to the back and formed to close the compartment and form the upper side of the cushion, the opposite ends of the cushion closing the ends of the compartment.

In testimony whereof I hereunto affix my signature.

LEOPOLD A. BAUM.